Oct. 31, 1961 W. GIBBS ET AL 3,007,128

HOLDER FOR RADIO TUBE

Filed Feb. 8, 1960

INVENTORS.
Walter Gibbs
George Mollin

BY James and Franklin

ATTORNEYS

United States Patent Office 3,007,128

Patented Oct. 31, 1961

3,007,128

HOLDER FOR RADIO TUBE

Walter Gibbs, Dover Hills, N.J., and George Mollin, Far Rockaway, N.Y., assignors, by mesne assignments, to Johnson & Hoffman Manufacturing Corporation, Mineola, N.Y., a corporation of New York Filed Feb. 8, 1960, Ser. No. 7,472
10 Claims. (Cl. 339—75)

This invention relates to holders for radio tubes, particularly for use with printed circuitry utilizing molded sockets disposed on a printed circuit board.

The present invention concerns vacuum tubes or electron emission tubes, hereinafter for convenience called simply "radio tubes," although such tubes are also widely used in television receivers and other electronic equipment. Inasmuch as the chassis carrying the tubes may be disposed vertically or even be inverted, it is important to guard against loss of a tube from its socket. For this purpose holders have been devised, and one such holder which has been used with a metal chassis having flush sockets, comprises a resilient ring which is eyeletted to the chassis at the opposite sides of the socket, and the halves of which are bent upward from the chassis to frictionally engage the cylindrical base of a tube. The tube is easily inserted, but difficult to withdraw unless the sides of the ring are preliminary pressed down toward the chassis.

With the increasing use of printed circuitry, there has been a corresponding use of tube sockets which are disposed above the printed circuit board. The socket is held by soldering its lugs to the printed circuitry conductors, and it would not be feasible to use eyelets. For both of these reasons the resilient ring type of holder has not been used with printed circuitry.

The primary object of the present invention is to provide an improved tube holder of the resilient ring type which is usable with printed circuitry, and more specifically with molded cylindrical sockets disposed above a printed circuit board. Still another object is to so design the holder that it will remain with the socket rather than with the tube, if a tube is mistakenly pulled out of its socket by brute force, without preliminarily depressing the sides of the ring as should be done. A more specific object is to facilitate proper orientation of the holder when first applying it to the socket.

To accomplish the foregoing general objects, and other more specific objects which will hereinafter appear, the invention resides in the radio tube holder elements and their relation one to another as are more particularly described in the following specification. The specification is accompanied by a drawing in which:

FIGURE 1 is a plan view of the blank for a radio tube holder embodying features of the invention;

FIGURES 2 and 2*a* are fragmentary views drawn to greatly enlarged scale to explain a detail;

Figure 7:
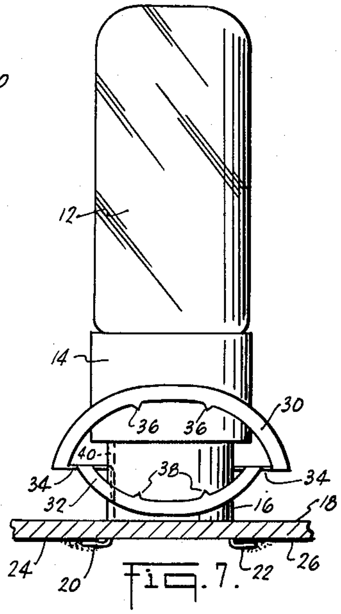
FIGURE 7 is a similar view showing a radio tube inserted in the socket and holder.

Referring to the drawing, and more particularly to FIGURE 7, the radio tube 12 has a cylindrical base 14 with a ring of tube prongs (not shown) which are slidably received in the mating contacts of a socket 16, which is permanently secured to a printed circuit board 18. The socket is generally cylindrical and is mounted above the printed circuit board. It has a ring of soldering lugs 20, 22 which project downward through the board 18 and are bent outward where they underlie the ends of printed circuit conductors 24, 26.

Additional contact is made by soldering, usually by an immersion or so-called "pot soldering" process. The soldering serves for electrical connection, and also mechanically anchors the socket 16 on the board 18. For simplicity, FIGURES 6, 7 and 8 of the drawing show only two of the outwardly bent soldering lugs, but it will be understood that in practice there is a ring of such soldering lugs, one for each contact in the socket.

The usual resilient ring type of tube holder is not applicable to this construction. However, the present improved holder comprises two resilient rings 30 and 32 connected at the opposite ends of a diameter indicated at 34. The halves of ring 32 are bent downward from the diameter 34, and the halves of ring 30 are bent upward from diameter 34. The downwardly bent ring 32 is adapted to readily slide over the cylindrical socket 16, and to resist upward movement therefrom. The upwardly bent ring 30 is adapted to readily receive the cylindrical base 14 of a radio tube, and to resist upward movement of the tube. The rings preferably have inwardly projecting tangs indicated at 36 and 38.

Figure 1:
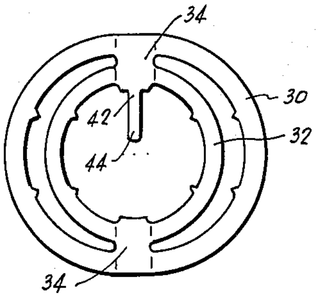

When, as in the present case, the socket 16 is smaller in diameter than the tube base 14, the entire holder is preferably stamped out of a single piece of resilient metal. The blank for the present holder is illustrated in FIGURE 1, and it will be seen that the rings 30 and 32 are concentric and are joined at diametrically opposite points indicated at 34. The tangs are formed as a part of the stamping operation.

Figure 3:
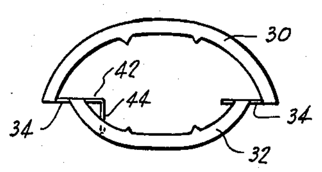
FIGURE 3 is an elevation of the tube holder after the rings have been bent.
Figure 4:
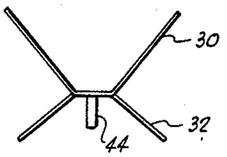
FIGURE 4 is an elevation of the tube holder looking toward one end of FIGURE 3.
Figure 5:
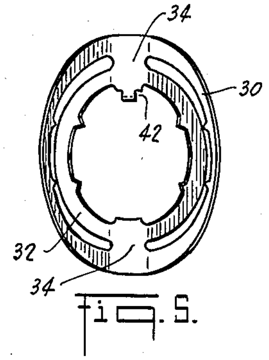
FIGURE 5 is a plan view of the tube holder.

After the rings have been bent in opposite direction, as shown in FIGURES 3 and 4, the plan view changes from that shown in FIGURE 1 to that shown in FIGURE 5.

Figure 2:
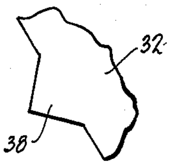
Figure 2A:
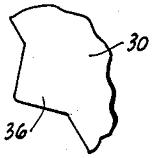

To release the vacuum tube when removing the same, it is merely necessary to bend the halves of the ring 30 downward somewhat with one hand, while removing the tube with the other. However, because someone may mistakenly simply pull the tube upward without releasing the grip of the holder, it is desirable to insure that the holder will remain on the socket instead of coming up with the tube. For this purpose, the tangs of ring 32 are preferably made sharper than the tangs of ring 30, and this difference is shown in FIGURES 2 and 2*a* of the drawing. In FIGURE 2, the tang 38 of ring 32 comes to a sharp point. In FIGURE 2*a*, the tang 36 of ring 30 is dulled slightly, in this case by giving it a radius of $^{20}/_{1000}$ of an inch.

Figure 6:
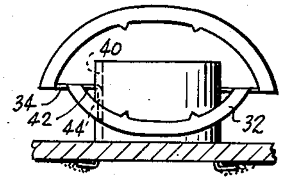
FIGURE 6 shows the tube holder applied to a socket on a printed circuit board.

It also is desirable to prevent rotation of the holder. The socket 16 usually is provided with a keyway 40 (FIGURE 6). In accordance with a further feature of the present holder, it has a key 42 which mates with the keyway 40. This key is shown in FIGURE 5, and it preferably projects inward from one of the two diametrically related connecting parts 34.

One difficulty is that the downwardly bent sides of ring 32 engage the socket while the connecting parts 34 are still well above the socket. To facilitate proper orientation as the holder is placed over the socket, the key 42 is given a downwardly projecting tongue 44 of substantial length. The blank of FIGURE 1 has a long diametrical projection, its length being adequate to provide both the horizontal key portion 42 and the downwardly directed tongue 44. The latter is of such length that it finds the keyway 40 as the holder is being placed over the socket and before the tangs bite into the side wall of the socket.

In the present case, the holder is made out of a No. 1050 carbon steel having a thickness of 0.015 inch. The steel is in an annealed or soft condition when it is stamped to shape as shown in FIGURE 1, and bent to the configuration shown in FIGURES 3, 4 and 5. The holders then are heat treated and tempered to give them the desired hardness and resilience.

As so far described, it is assumed that the socket 16 is smaller in diameter than the tube base 14. However, it will be understood that if a tube were used with a socket having a diameter larger than the tube base, the holder could be made much as here described, except that the larger ring would be bent downward; the smaller ring would be bent upward; and the sharper tangs would be provided on the larger ring.

Figure 8:
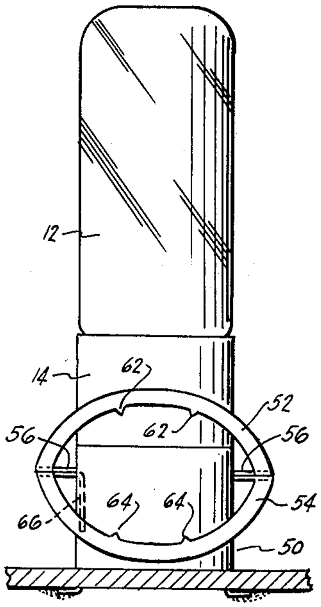
FIGURE 8 is a view similar to FIGURE 7, but showing a modification in which the socket has approximately the same diameter as the tube base.
Figure 9:
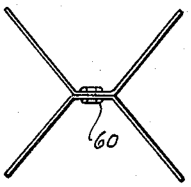
FIGURE 9 is an end view of a modified holder.
Figure 10:
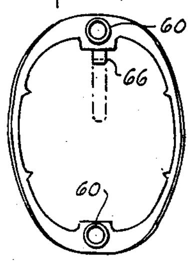
FIGURE 10 is a plan view of the modified holder shown in FIGURE 9.

Another possibility is the use of a socket having the same (or nearly the same) diameter as the tube base. Such a combination is illustrated in FIGURE 8, and in such case, it is not possible to stamp both rings out of a single piece of metal. Instead, two separate rings may be formed and secured together. In FIGURE 8, the socket 50 has the same diameter as the tube base 14. The upper ring 52 is dimensioned to receive the tube base 14, and the lower ring 54 has the same size as the upper ring 52. These rings are secured together at the diametrically opposed parts 56, and in FIGURE 8 this is assumed to be done by spot welding. However, the rings also may be secured together by small rivets or eyelets, and the latter are shown at 60 in FIGURES 9 and 10.

In simplest form, the rings might be identical, but in preferred form they differ somewhat, while having the same diameter. One difference is that the tangs 62 on the upper ring are preferably given a slight radius as shown in FIGURE 2*a*, while the tangs 64 on the lower ring are preferably kept sharp as shown in FIGURE 2. Another difference is that the ring 54 preferably has a locating key and tongue indicated at 66, while no corresponding key is needed on the upper ring.

It is believed that the construction and method of use of our improved tube holder, as well as the advantages thereof, will be apparent from the foregoing detailed description. It will also be apparent that while we have shown and described our invention in several preferred forms, changes may be made in the structures shown, without departing from the scope of the invention as sought to be defined in the following claims.

We claim:

1. A tube holder comprising two resilient rings connected at the opposite ends of a diameter, the halves of one ring being bent downward from said diameter, the halves of the other ring being bent upward from said diameter, the downwardly bent ring being adapted to slide over a socket and to resist upward movement therefrom, the upwardly bent ring being adapted to receive the base of a radio tube and to resist upward movement of the tube.

2. A tube holder comprising two resilient rings connected at the opposite ends of a diameter, the halves of one ring being bent downward from said diameter, the halves of the other ring being bent upward from said diameter, the halves of both rings having inwardly projecting tangs, the downwardly bent ring being adapted to slide over a socket and to resist upward movement therefrom, the upwardly bent ring being adapted to receive the base of a radio tube and to resist upward movement of the tube.

3. A tube holder comprising two resilient rings connected at the opposite ends of a diameter, the halves of one ring being bent downward from said diameter, the halves of the other ring being bent upward from said diameter, the halves of both rings having inwardly projecting tangs, the downwardly bent ring being adapted to slide over a socket and to resist upward movement therefrom, the upwardly bent ring being adapted to receive the base of a radio tube and to resist upward movement of the tube, the tangs of said downwardly bent ring being sharper than the tangs of said upwardly bent ring.

4. A tube holder comprising two resilient rings connected at the opposite ends of a diameter, the halves of one ring being bent downward from said diameter, the halves of the other ring being bent upward from said diameter, the halves of both rings having inwardly projecting tangs, and a locating key projecting inwardly and downwardly from said rings at one end of said diameter, the downwardly bent ring being adapted to slide over a socket and to resist upward movement therefrom, the upwardly bent ring being adapted to receive the base of a radio tube and to resist upward movement of the tube.

5. A tube holder comprising two resilient rings connected at the opposite ends of a diameter, the halves of one ring being bent downward from said diameter, the halves of the other ring being bent upward from said diameter, the halves of both rings having inwardly projecting tangs, and a locating key projecting inwardly for a short distance and downwardly for a substantial distance from said rings at one end of said diameter, the downwardly bent ring being adapted to slide over a socket and to resist upward movement therefrom, the upwardly bent ring being adapted to receive the base of a radio tube and to resist upward movement of the tube, the tangs of said downwardly bent ring being sharper than the tangs of said upwardly bent ring.

6. A tube holder comprising two resilient concentric rings stamped from a single piece of sheet metal and connected at the opposite ends of a diameter, the halves of one ring being bent downward from said diameter, the halves of the other ring being bent upward from said diameter, the downwardly bent ring being adapted to slide over a socket and to resist upward movement therefrom, the upwardly bent ring being adapted to receive the base of a radio tube and to resist upward movement of the tube.

7. A tube holder comprising two resilient concentric rings stamped from a single piece of sheet metal and connected at the opposite ends of a diameter, the halves of one ring being bent downward from said diameter, the halves of the other ring being bent upward from said diameter, the halves of both rings having inwardly projecting tangs, the downwardly bent ring being adapted to slide over a socket and to resist upward movement therefrom, the upwardly bent ring being adapted to receive the base of a radio tube and to resist upward movement of the tube.

8. A tube holder comprising two resilient concentric rings stamped from a single piece of sheet metal and connected at the opposite ends of a diameter, the halves of one ring being bent downward from said diameter, the halves of the other ring being bent upward from said diameter, the halves of both rings having inwardly projecting tangs, the downwardly bent ring being adapted to slide over a socket and to resist upward movement therefrom, the upwardly bent ring being adapted to receive the base of a radio tube and to resist upward movement of the tube, the tangs of said downwardly bent ring being sharper than the tangs of said upwardly bent ring.

9. A tube holder comprising two resilient concentric rings stamped from a single piece of sheet metal and connected at the opposite ends of a diameter, the halves of one ring being bent downward from said diameter, the halves of the other ring being bent upward from said diameter, the halves of both rings having inwardly projecting tangs, and a locating key projecting inwardly and downwardly from said rings at one end of said diameter, the downwardly bent ring being adapted to slide over a socket and to resist upward movement therefrom, the upwardly bent ring being adapted to receive the base of a radio tube and to resist upward movement of the tube.

10. A tube holder comprising two resilient concentric rings stamped from a single piece of sheet metal and connected at the opposite ends of a diameter, the halves of one ring being bent downward from said diameter, the halves of the other ring being bent upward from said diameter, the halves of both rings having inwardly projecting tangs, and a locating key projecting inwardly for a short distance and downwardly for a substantial distance from said rings at one end of said diameter, the downwardly bent ring being adapted to slide over a socket and to resist upward movement therefrom, the upwardly bent ring being adapted to receive the base of a radio tube and to resist upward movement of the tube, the tangs of said downwardly bent ring being sharper than the tangs of said upwardly bent ring.

References Cited in the file of this patent

UNITED STATES PATENTS

| | | |
|---|---|---|
| 973,568 | Russell | Oct. 25, 1910 |
| 2,140,442 | Clark | Dec. 13, 1938 |
| 2,388,650 | Whittell et al. | Nov. 6, 1945 |